US012604210B2

(12) United States Patent
Hobbs et al.

(10) Patent No.: US 12,604,210 B2
(45) Date of Patent: Apr. 14, 2026

(54) SMALL CELL DEPLOYMENT

(71) Applicant: IONX Networks Limited, Marlow (GB)

(72) Inventors: Andrew Guy Hobbs, Marlow (GB); Paul Nicholas Senior, Marlow (GB)

( * ) Notice: Subject to any disclaimer, the term of this patent is extended or adjusted under 35 U.S.C. 154(b) by 314 days.

(21) Appl. No.: 18/448,711

(22) Filed: Aug. 11, 2023

(65) Prior Publication Data

US 2024/0098512 A1     Mar. 21, 2024

(30) Foreign Application Priority Data

Aug. 11, 2022     (GB) ..................................... 2211760

(51) Int. Cl.
| | |
|---|---|
| *H04W 16/18* | (2009.01) |
| *H04B 17/318* | (2015.01) |
| *H04B 17/336* | (2015.01) |
| *H04W 24/02* | (2009.01) |
| *H04W 24/04* | (2009.01) |

(52) U.S. Cl.
CPC .......... *H04W 16/18* (2013.01); *H04B 17/328* (2023.05); *H04B 17/336* (2015.01)

(58) Field of Classification Search
CPC ..... H04W 16/18; H04W 24/02; H04W 24/04; H04B 17/328; H04B 17/336
See application file for complete search history.

(56) References Cited

U.S. PATENT DOCUMENTS

| | | | | |
|---|---|---|---|---|
| 2012/0264439 | A1* | 10/2012 | Jorguseski | ............ H04W 16/18 |
| | | | | 455/446 |
| 2015/0156611 | A1* | 6/2015 | Aggarwal | ............. H04W 24/08 |
| | | | | 455/456.1 |
| 2015/0198447 | A1* | 7/2015 | Chen | .................... G01C 21/206 |
| | | | | 701/472 |
| 2015/0327082 | A1* | 11/2015 | Kadel | ................ H04W 64/003 |
| | | | | 455/449 |
| 2015/0334576 | A1 | 11/2015 | Sofman et al. | |
| 2016/0029224 | A1 | 1/2016 | Edge | |
| 2016/0191142 | A1 | 6/2016 | Boss et al. | |
| 2017/0127241 | A1 | 5/2017 | Sjölund et al. | |
| 2017/0150365 | A1* | 5/2017 | Goswami | .............. H04W 16/18 |
| 2018/0336286 | A1* | 11/2018 | Shah | ........................ G06F 1/163 |

(Continued)

FOREIGN PATENT DOCUMENTS

| | | | | | |
|---|---|---|---|---|---|
| CN | 107071821 | A | * | 8/2017 | ........... G06F 16/284 |
| EP | 2741535 | A1 | | 6/2014 | |

(Continued)

OTHER PUBLICATIONS

First Examination Report from counterpart British Application No. 2211760.0 dated Apr. 11, 2025, 4 pp.

*Primary Examiner* — Harry H Kim

(74) *Attorney, Agent, or Firm* — Patterson + Sheridan, LLP

(57) ABSTRACT

A computer-implemented method for determining information for the deployment of one or more small cells into an existing MNO network, the method comprising: retrieving a spatial map of building locations; retrieving a plurality of sensor data on the MNO network collected from a plurality of mobile network devices, wherein the sensor data comprises a measurement location; processing the plurality of sensor data and the spatial map of building locations to generate a spatial map of performance and/or usage characteristics of the MNO network.

19 Claims, 10 Drawing Sheets

(56)        References Cited

U.S. PATENT DOCUMENTS

| | | | | |
|---|---|---|---|---|
| 2019/0066427 | A1* | 2/2019 | Selleck | .............. G06Q 30/0201 |
| 2020/0100054 | A1 | 3/2020 | Anders et al. | |
| 2020/0213864 | A1 | 7/2020 | Vanek et al. | |
| 2021/0360427 | A1* | 11/2021 | Jat | ........................... H04W 4/02 |
| 2022/0182791 | A1 | 6/2022 | Eckert et al. | |
| 2022/0326340 | A1* | 10/2022 | Meiyappan | ........... H04W 16/14 |

FOREIGN PATENT DOCUMENTS

| | | | |
|---|---|---|---|
| EP | 4322585 | A1 | 2/2024 |
| GB | 2136352 | A | 9/1984 |
| GB | 2593529 | A | 9/2021 |
| GB | 2603604 | A | 8/2022 |

* cited by examiner

110

Nimbus Street

Cumulus Street

Stratus Street

130

Cirrus Street

Stratus Street

Nimbus Street

Cumulus Street

Cirrus Street

100B

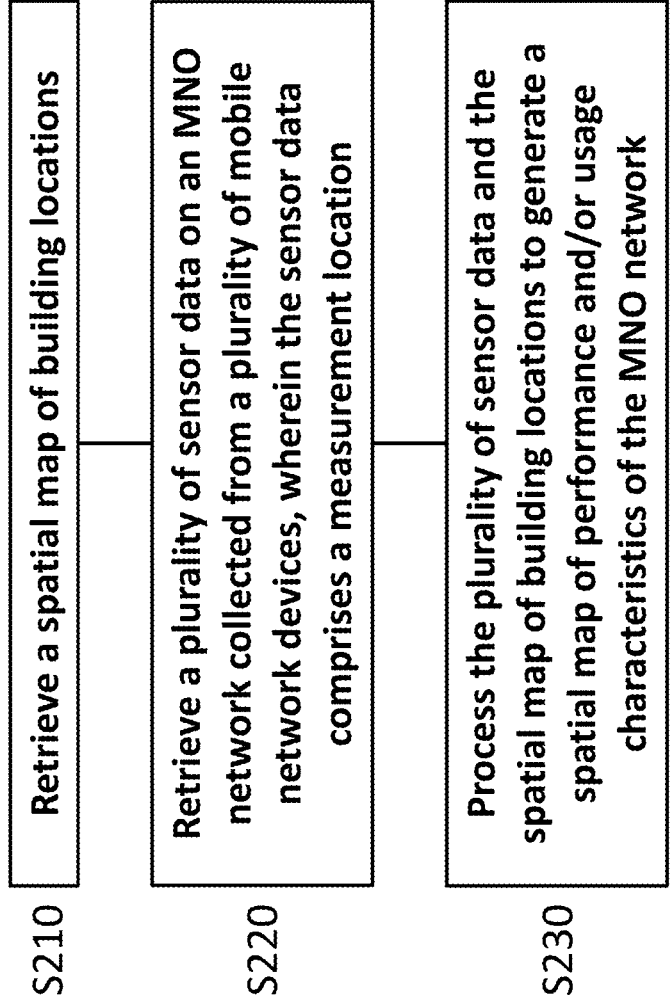

S210 — Retrieve a spatial map of building locations

S220 — Retrieve a plurality of sensor data on an MNO network collected from a plurality of mobile network devices, wherein the sensor data comprises a measurement location S230 — Process the plurality of sensor data and the spatial map of building locations to generate a spatial map of performance and/or usage characteristics of the MNO network

| Mobile Network Device ID | Measurement Time | Measurement Coordinates | Carrier ID | Frequency Band (MHz) | RSRP (dBm) | SINR (dB) | DL Bits/s (bps) | UL Bits/s (bps) | DL Bits | UL Bits |
|---|---|---|---|---|---|---|---|---|---|---|
| AS4X1 | 02/01/2022, 14:23:34 | 51.51° N; 0.11° W | 172 | 2400 | -83 | 15 | $1.8 \times 10^7$ | $3.0 \times 10^6$ | $1.3 \times 10^{11}$ | $7 \times 10^{10}$ |
| BI5Y2 | 02/01/2022, 14:24:40 | 51.52° N; 0.12° W | 158 | 3450 | -92 | 12 | $5 \times 10^7$ | $9.6 \times 10^6$ | $8 \times 10^{11}$ | $1.2 \times 10^{11}$ |
| FG9N2 | 02/01/2022, 14:25:07 | 51.52° N; 0.13° W | 172 | 2420 | -81 | 17 | $3 \times 10^7$ | $1.2 \times 10^7$ | $3 \times 10^{11}$ | $1.1 \times 10^{11}$ |

Fig. 3

Figure 5:
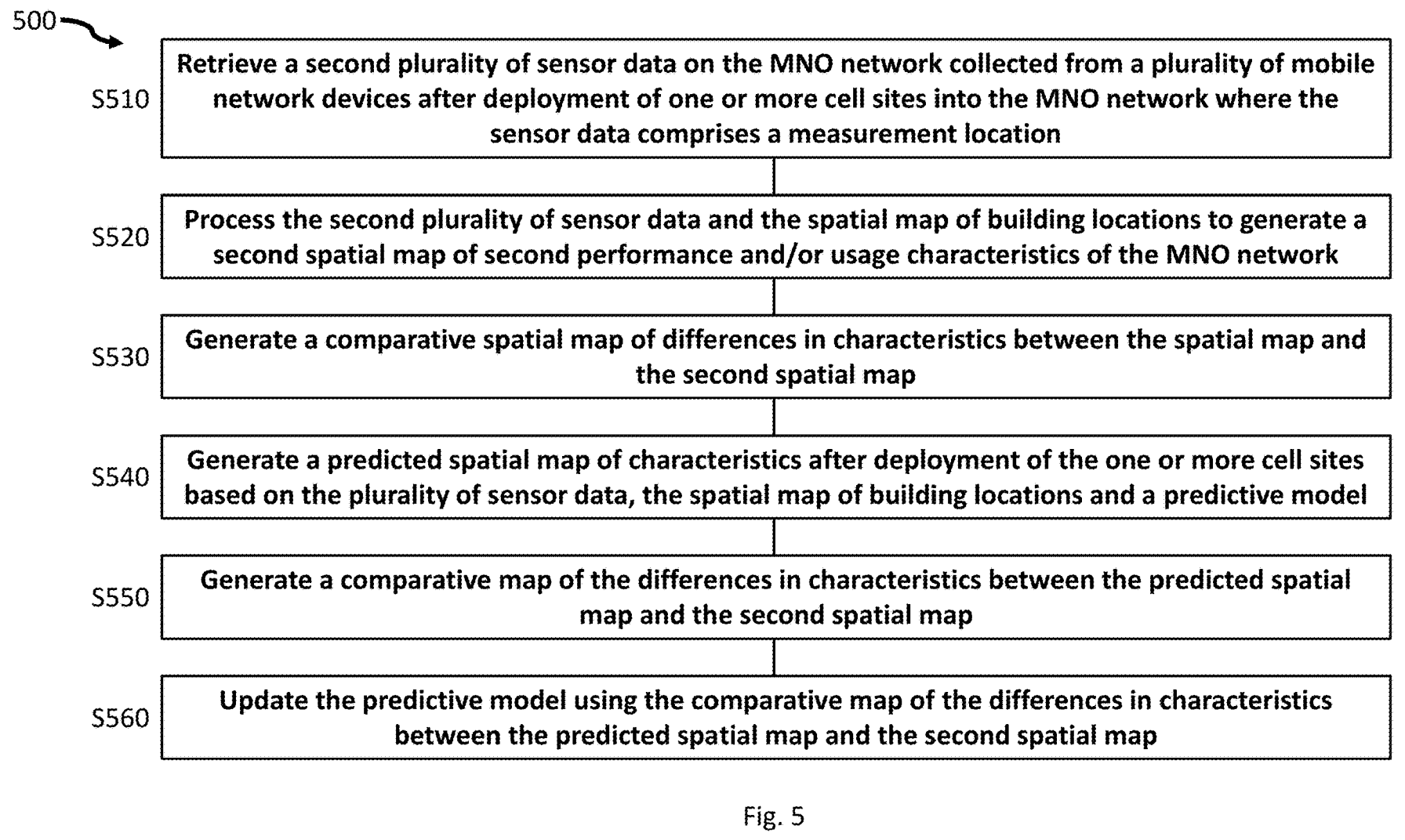

S510   Retrieve a second plurality of sensor data on the MNO network collected from a plurality of mobile network devices after deployment of one or more cell sites into the MNO network where the sensor data comprises a measurement location

S520   Process the second plurality of sensor data and the spatial map of building locations to generate a second spatial map of second performance and/or usage characteristics of the MNO network

S530   Generate a comparative spatial map of differences in characteristics between the spatial map and the second spatial map

S540   Generate a predicted spatial map of characteristics after deployment of the one or more cell sites based on the plurality of sensor data, the spatial map of building locations and a predictive model

S550   Generate a comparative map of the differences in characteristics between the predicted spatial map and the second spatial map

S560   Update the predictive model using the comparative map of the differences in characteristics between the predicted spatial map and the second spatial map

SMALL CELL DEPLOYMENT

This application claims priority to Great Britain Application No. 2211760.0, filed Aug. 11, 2022, the entire content of which is incorporated by reference herein.

FIELD AND BACKGROUND

The present techniques relate to determining information useful for deployment of one or more small cells into an existing Mobile Network Operator (MNO) network. More particularly, the disclosure describes a method, computer program and device which processes a retrieved spatial map and a plurality of sensor data to generate a spatial map of performance and/or usage characteristics of the MNO network.

In recent years the demands on mobile networks have steadily increased with consumers increasingly coming to expect consistent high performance levels with minimal signal interruptions or other connectivity issues. As demand has grown regulators have released new high-frequency spectrum bands in an attempt to satisfy this consumer demand. While these high-frequency bands have a number of advantages, including the potential for very high through-puts, such bands have weak signal penetration into structures and are more susceptible to changing environmental conditions which can lead to uneven performance.

A number of techniques have been developed to address one or more of these problems. One approach has been to overprovision the number of macrocells in an MNO to allow for a certain degree of signal degradation while maintaining performance. Another approach, has been to ensure that each area covered by the MNO is served by a range of frequency bands such that if the performance of a particular, e.g. high frequency, band is impeded, a different, e.g. lower, frequency band should be available to the consumer.

However, as identified by the present inventors, each of these prior techniques have a number of downsides. Over-provisioning is expensive due to duplication of hardware and the difficulty associated with identifying suitable macrocell locations, and still risks leaving gaps in coverage due to unexpectedly poor real-world performance. Providing coverage using a range of frequencies necessitates the MNO licensing spectrum across the range of frequencies which may, depending on the licensing regime be unavailable or expensive. In addition, as with overprovisioning there is a risk that there may be gapes in coverage due to unexpectedly poor real-world performance.

Accordingly, as identified by the present inventors, it is desirable to provide an approach which allows for efficient deployment of cells which ensure good real world performance.

At least certain embodiments of the present disclosure address one or more of these problems as set out above.

SUMMARY

Viewed from one perspective, there is provided a computer-implemented method for determining information for the deployment of one or more small cells into an existing MNO network, the method comprising: retrieving a spatial map of building locations; retrieving a plurality of sensor data on the MNO network collected from a plurality of mobile network devices, wherein the sensor data comprises a measurement location; processing the plurality of sensor data and the spatial map of building locations to generate a spatial map of performance and/or usage characteristics of the MNO network.

In other words, the present approach can be considered, for example, as a technique which allows for an accurate real-world assessment of the actual state of an existing MNO deployment. The approach does so by processing a plurality of location-tagged sensor data collected live on the actual MNO deployment from a plurality of mobile network devices. In some examples, the plurality of sensor data can be very large comprising more than one billion data points. This real-world sensor data is processed together with a map of building locations present in the MNO deployment in order to generate map of performance and/or usage characteristics of the MNO network. The technique thereby provides information which is usable to direct the deployment of small cells into an existing MNO network, for example, by identifying holes in MNO coverage (or locations with poor MNO performance) which could be ameliorated by deployment of small cells. The present technique can identify these locations even where these are very small, in some examples down to the scale of a few meters, which are due, for example, to a building structure or materials leading to a surprising localised drop in MNO coverage or performance.

Viewed from one perspective, there is provided a computer program for controlling a device to perform any of the above-described methods. In some examples, the computer program is encoded on a computer-readable medium.

Viewed from one perspective, there is provided a device comprising: a processor and data storage, the device being configured to perform any of the above-described methods.

Other aspects will also become apparent upon review of the present disclosure, in particular upon review of the Brief Description of the Drawings, Detailed Description and Claims sections.

BRIEF DESCRIPTION OF THE DRAWINGS

Examples of the disclosure will now be described, by way of example only, with reference to the accompanying drawings in which:

Figure 1A:
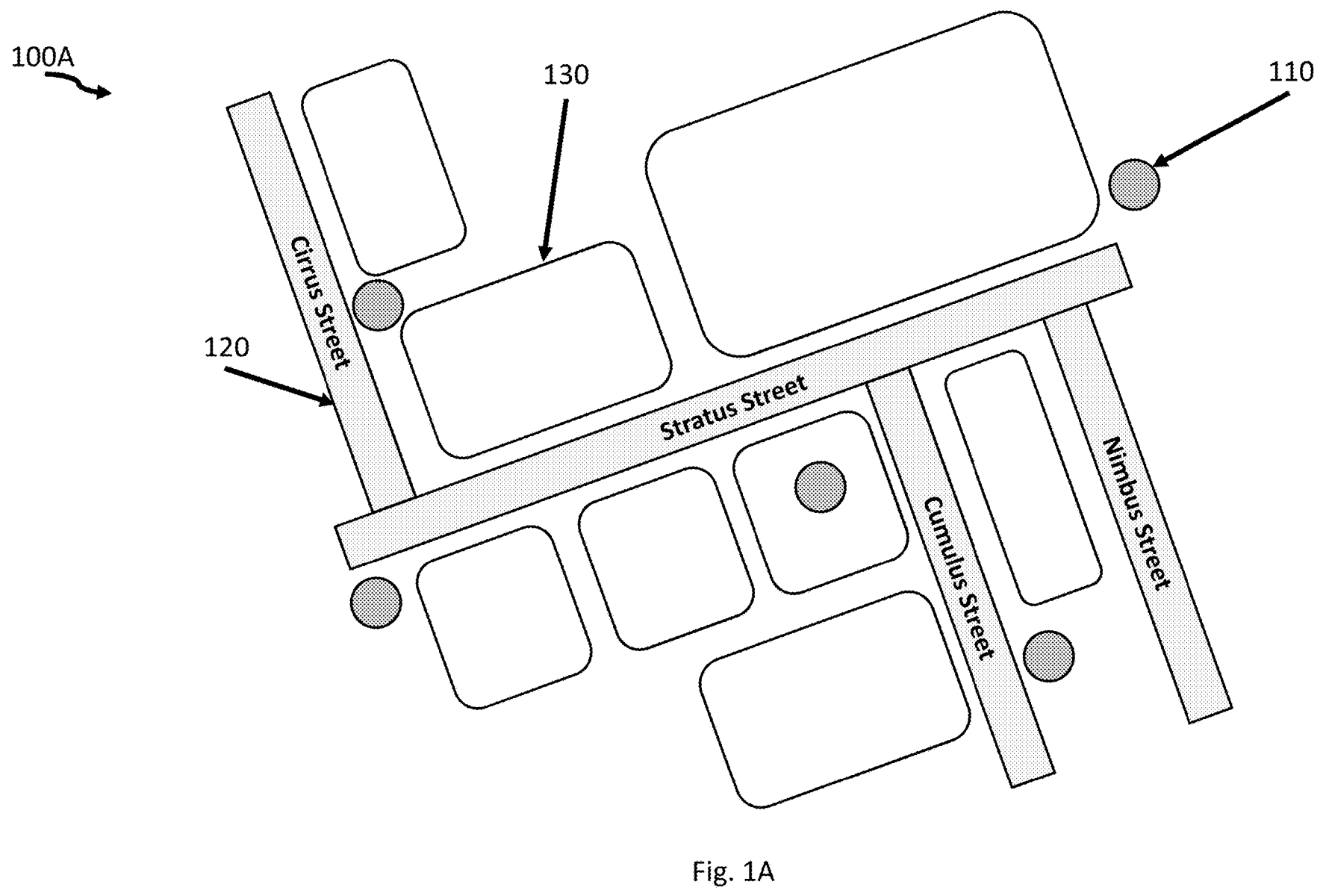

FIG. 1A: Schematically illustrates a spatial map of building locations on which macrocells of an MNO have been superimposed.

FIG. 2: Schematically illustrates a method for determining information for the deployment of one or more small cells into an existing MNO network according to teachings of the disclosure.

FIG. 3: Schematically illustrate a data table depicting a plurality of sensor data collected from a plurality of mobile network devices.

FIG. 5: Schematically illustrates a method for assessing the effect of implementing a deployment plan according to teachings of the disclosure.

Figure 1B:
FIG. 1B: Schematically illustrates a spatial map of building locations with a measure of MNO network quality superimposed on a per-structure basis at a first time.

While the disclosure is susceptible to various modifications and alternative forms, specific example approaches are shown by way of example in the drawings and are herein described in detail. It should be understood however that the drawings and detailed description attached hereto are not intended to limit the disclosure to the particular form disclosed but rather the disclosure is to cover all modifications, equivalents and alternatives falling within the spirit and scope of the claimed invention.

It will be recognised that the features of the above-described examples of the disclosure can conveniently and interchangeably be used in any suitable combination.

DETAILED DESCRIPTION

FIG. 1A shows a schematic illustration of a spatial map with building locations on which macrocells of an MNO have been superimposed. The spatial map 100A depicts a plurality of cell sites 110, a plurality of streets 120 and a plurality of buildings 130. It will be appreciated that for the inventive techniques described herein the spatial map 100A need only contain the locations of the plurality of buildings 130 and need not contain either of the plurality of cell sites 110 or the plurality of streets 120. It will also be appreciated that the plurality of buildings 130 is not necessarily limited to habitable structures but, in some examples, other structures or fixed objects present in the environment.

FIG. 1B shows a schematic illustration of building locations with a measure of MNO network quality superimposed on a per-structure basis at a first time. As can be seen in spatial map 100B the plurality of buildings 130 can be superimposed with a measure of MNO network quality on a per-structure basis. In the present example, the darker the shading the higher the measure of MNO network quality for that building. It will be appreciated that in other examples, the present techniques can provide a spatial map of network quality at different scales, for example, geographic hexbins of fixed size which in some examples are any of 1 m, 5 m, 10 m, 50 m, 100 m, 500 m and 1000 m in diameter. In the present example the measure of MNO network quality is a measure of coverage (e.g. signal strength). In other examples, the measure of MNO network quality can include a measure of the signal power received (e.g. Reference Signal Received Power (RSRP)), a measure of signal to noise (e.g. signal-to-interference-plus-noise ratio (SINR)), a measure of percentage dropped traffic, a measure of average traffic (e.g. downloaded bits per second ("DL bits/s") and/or uploaded bits per second ("UL bits/s")), a measure of peak traffic (e.g. DL bits/s and/or UL bits/s), a measure of total traffic over a period (e.g. DL bits, UL bits) or an amalgamation of any of the above measures to produce an overall score (e.g. a summation of the various measures as compared to base reference values).

Figure 1C:
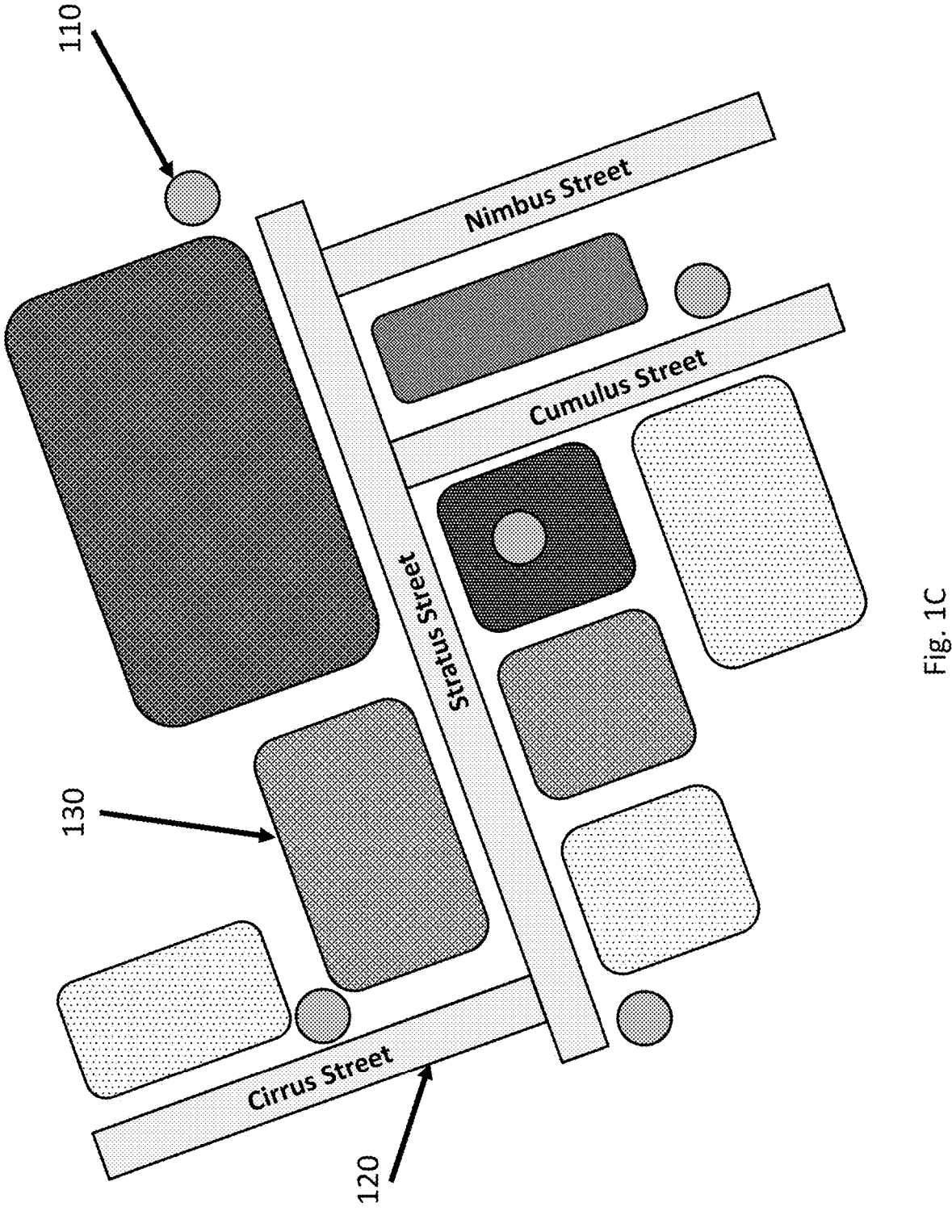
FIG. 1C: Schematically illustrates a spatial map of building locations with a measure of MNO network quality superimposed on a per-structure basis at a second time.

FIG. 1C shows a schematic illustration of building locations with a measure of MNO network quality superimposed on a per-structure basis at a second time. As can be seen, spatial map 100C is also superimposed with a measure of MNO network quality on a per-structure basis, however, the degree of shading of the plurality of buildings 130 is altered compared to FIG. 1B which represents a shift in the network quality between the two times. In the present example, the MNO network quality is generally lower at the second time than at the first time. This can, for example, represent a change in environmental conditions (e.g. a change from clear weather to foggy conditions) between the two times and a comparison between the two figures can provide an indication of the effect of that environmental condition. Beyond changes in environmental conditions, the present techniques can be used, by way of non-limiting examples, to depict the difference in measures of MNO network quality between: different times of day (e.g. rush hour vs the middle of the night); before and after installation of a new cell site; before and after construction of a new building, structure, or vegetation; before and after an update to spectrum allocation; and before and after unexpected alterations in end user trend (e.g. a drop in traffic due to COVID-19).

FIG. 2 shows a schematic illustration of a method 200 for determining information for the deployment of one or more small cells into an existing MNO network according to teachings of the disclosure. It will be understood that the method 200 can be performed using the electronic device of the type shown in FIG. 7. The method includes the following steps.

At step S210, the method retrieves a spatial map of building locations. In some examples, the spatial map of building locations may be similar to those depicted in any of FIG. 1A, 1B or 1C, though as noted above the spatial map need only contain information on building locations. The method then continues to step S220.

At step S220, the method retrieves a plurality of sensor data on an MNO network collected from a plurality of mobile network devices, wherein the sensor data comprises a measurement location. In some examples, retrieving the plurality of sensor data comprises accessing a database storing one or more of the plurality of sensor data. Thereby the method need not have a live connection to each of the plurality of mobile network devices. It will be appreciated that the database may be located either substantially integral with the computing device that performs the method or remote from the computing device, for example, as part of a server. In other examples, retrieving the plurality of sensor data comprises receiving one or more of the plurality of sensor data from one or more of the plurality of mobile network devices. Thereby, the method can have access to the most recently available sensor data captured from each of the plurality of mobile network device which allows for a live view of MNO network characteristics.

Figure 4:
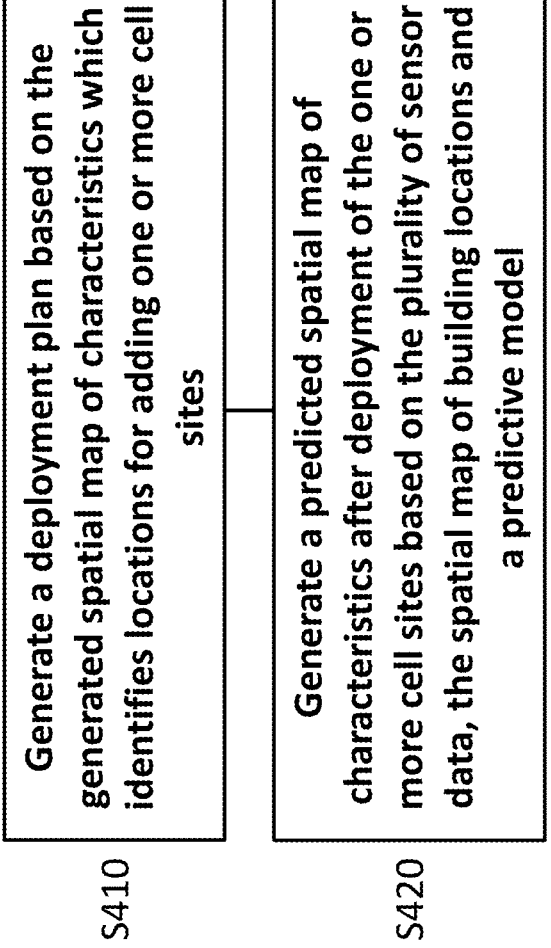
FIG. 4: Schematically illustrates a method for generating a deployment plan identifying locations for adding one or more cell sites according to teachings of the disclosure.

Examples of information which can be included in the sensor data is depicted in FIG. 4, discussed below. In some examples, the plurality of sensor data points comprises more than 1 billion measurement points. By collecting a large quantity of data, across a range of times and from a plurality of spatially separated devices, can allow the method to achieve a high temporal and/or spatial resolution of the MNO network characteristics.

It will be appreciated that, in some examples, one or more of the plurality of mobile network devices comprise UE and/or small cells. Using UE (User Equipment) devices to collect sensor data can vastly increase the quantity of data collected as, there are typically many more UE in a given area than there are cell sites. In addition, data from UE devices correlates well with the real-world usage conditions (i.e. when and where) in which consumers actually use the MNO. When small cells are used to collect sensor data the (partial) deployment of the small cells can be used to collect additional data, and in some examples, further refine a deployment plan. In some examples, one or more of the plurality of mobile network devices used to collect sensor data comprise macrocells.

The method then continues to step S230.

As step S230, the method processes the plurality of sensor data and the spatial map of building locations to generate a spatial map of performance and/or usage characteristics of the MNO network. In some examples, the processing comprises homogenising the sensor data into a standardised format. Thereby data can be collected from a wide variant of dissimilar mobile network devices but can nevertheless be accurately processed collectively. In some examples, the processing comprises extrapolating from the plurality of sensor data to measurement locations beyond the one or more measurement locations present in the plurality of sensor data. Thereby gaps in the data can be filled to provide a more detailed (probabilistic) spatial map of characteristics of the MNO network. In some examples, the processing comprises using an estimate of the difference in signal propagation loss between signals travelling inside and outside buildings. This estimate may be based on experimental measurements or determined by a machine learning model. Thereby the spatial map of characteristics can take into account the presence of buildings to enhance the map's accuracy. In some examples, the processing comprises correlating between two or more types of sensor data to generate a synthetic measurement. Thereby further useful characteristics of the MNO network can be generated. For example, a measure of congestion can be determined from combining usage data and SINR data; a measure of footfall density can be determined from the number of data points per unit area in a given time period; a measure of comparative characteristics can be determined between the relative usage of two or more network technologies (e.g. 2G/3G/4G/5G); a measure of comparative characteristics can be determined between the relative usage of two or more radio frequencies; and/or a cross-comparison between one or more sensor data types with "third party" data such as economic/weather/fibre prevalence data can be determined. In some examples, the characteristics comprise coverage, signal quality, percentage dropped traffic, average traffic, peak traffic and/or network usage. Thereby a spatial map of useful characteristics is provided.

In some cases, the sensor data comprises a measurement time, and wherein the characteristics are generated as a time-varying spatial map. Thereby temporal patterns in the characteristics can be determined which can, for example, be useful in determining or tweaking a deployment plan, for example, by determining regular periods of poor MNO characteristics. In some examples, the spatial map is generated by time of day, and/or the spatial map is generated by time and day of the week, and/or the spatial map is generated by time of year. Thereby temporal patterns on the order of days, weeks or years in the characteristics can be determined which can, for example, be useful in determining or tweaking a deployment plan and which may otherwise miss systematic patterns in MNO characteristics on these timescales. As an illustrative example, MNO characteristics may be good at a theme park during the working week but poor at weekends. As a second illustrative example, the MNO characteristics may be poor at a train station during rush hour but good at other times. As a third illustrative example, MNO characteristics may be poor at New Year's Eve.

In some examples, the method further comprises retrieving a spatial map of weather conditions, wherein the characteristics are generated as a weather-varying spatial map and wherein the generation of the spatial map is generated by processing the spatial map of weather conditions in conjunction with the plurality of sensor data and the spatial map of building locations. It will be appreciated that the retrieval of the spatial map of weather conditions may be performed before or after step S210 and may be performed before or after step S220. Thereby, the technique allows for spatial maps of MNO characteristics to be generated which show how weather conditions can affect MNO characteristics which may assist in determining or tweaking a deployment plan. By way of illustrative example, the spatial map of weather conditions may show the degree to which rain or fog reduces MNO characteristics across the geographic area. Such a spatial map could, for example, demonstrate that the reduction in MNO characteristics from adverse weather is smaller in areas with many buildings and is greater in areas with few buildings.

In some examples, the spatial map of characteristics provides characteristics at a configurable hexbin, per building or finer granularity. Thereby a fine granularity of sensor data can be provided down to a level support by the retrieved sensor data. In addition, when providing data on a pre-building level, a useful metric is provided which is of practical use to end users. In some examples, the degree of granularity supported by the sensor data can be automatically determined by the method. In some examples, sensor data is collected on a plurality of MNO networks and the spatial map of characteristics is generated for each MNO network. Thereby, the method allows for a direct comparison between a plurality of MNO networks using, in some examples, substantially identical methodologies and data thus improving the quality of the real-world comparison of the MNO networks. In other words, the data a methodology for comparing the plurality of MNO networks is directly comparable.

The present example depicts step S220 being performed after step S210, however, it will be appreciated that in other examples step S210 is performed after step S210.

FIG. 3 schematically illustrates a data table 300 depicting a plurality of sensor data collected from a plurality of mobile network devices. In the present example, the data in the table includes: mobile network device IDs, measurement coordinates, carrier IDs, frequency bands, RSRP, SINR, download (DL) bit/s, upload (UL) bits/s, DL bits and UL bits. Illustrative example values are shown in table 300. It will be appreciated that all data depicted will not necessarily be collected and indeed different mobile network devices may collect different information. For example, data collected by a small cell may be more detailed, and include more fields, than data collected by a UE device. In some examples, the sensor data collected may be limited just to a measurement location and one individual metric of an MNO network.

FIG. 4 schematically illustrates a method 400 for generating a deployment plan identifying locations for adding one or more cell sites according to teachings of the disclosure. It will be understood that the method 400 can be performed using the electronic device of the type shown in FIG. 7 and can, in some examples, be performed following step S230 of method 200 or following any of the steps of method 500. Method 400 includes the following steps.

Figure 6A:
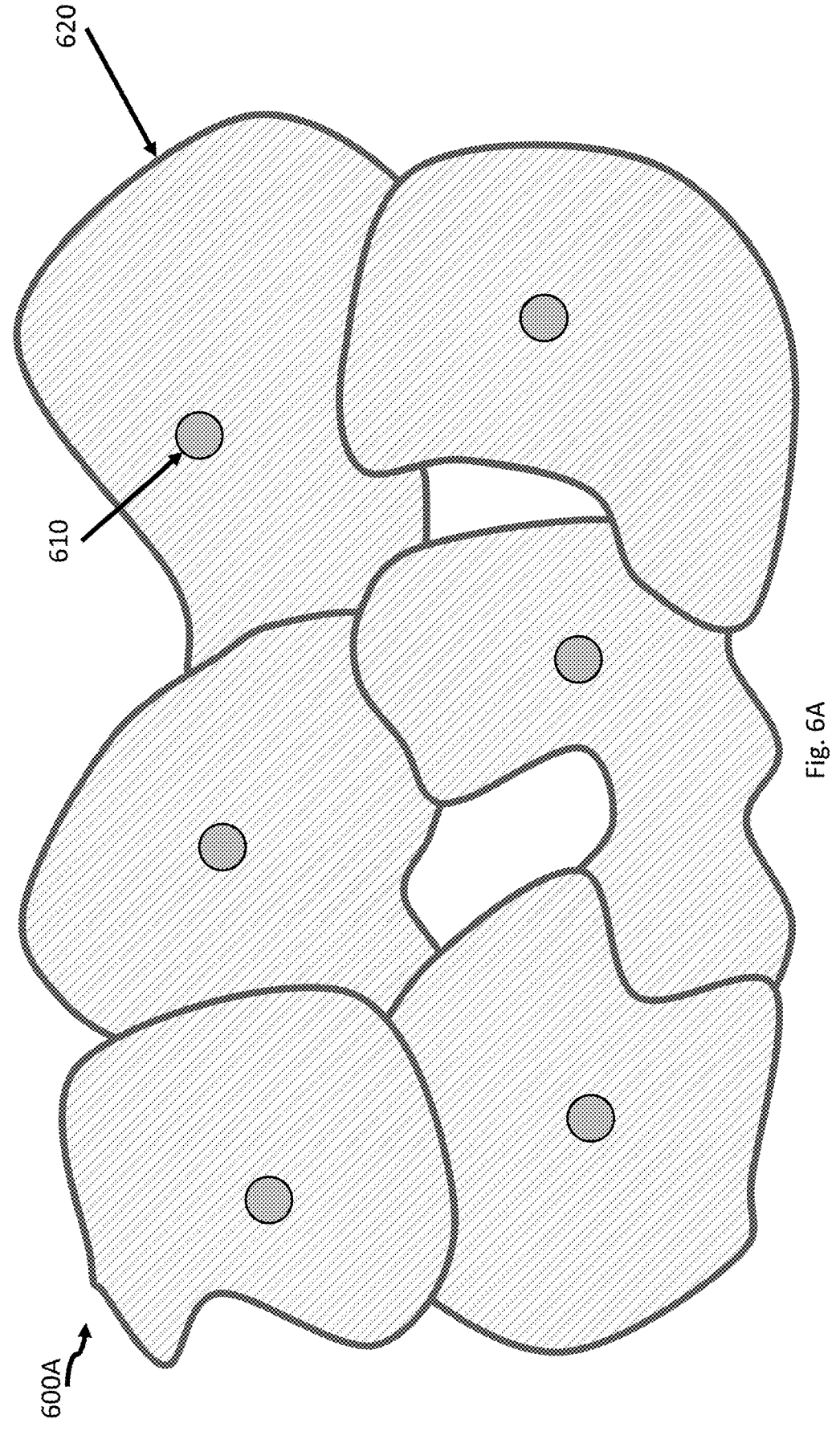
FIG. 6A: Schematically illustrates a MNO spatial coverage map before deployment of a number of small cells.

At step S410, the method generates a deployment plan based on the generated spatial map of characteristics which identifies locations for adding one or more cell sites. An example spatial map of MNO coverage is shown in FIG. 6A before deployment of additional cell sites and shown in FIG. 6B after deployment of additional cell sites. Thereby, a plan is derived which can address areas of poor MNO characteristics (e.g. gaps in coverage) in an efficient manner (e.g. minimising the number of additional cell sites required).

Figure 6B:
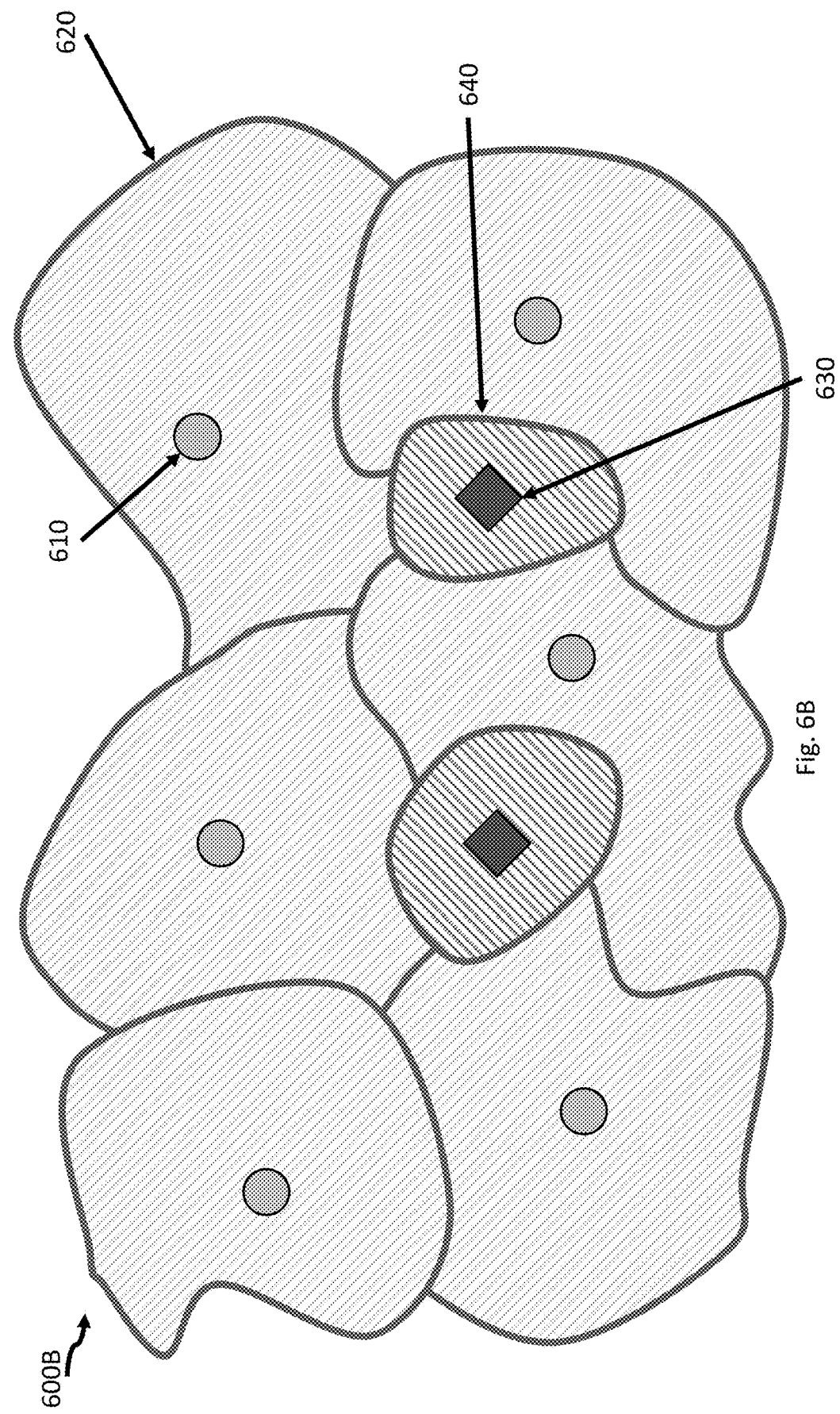
FIG. 6B: illustrates the MNO spatial coverage map after deployment of a number of small cells, according to teachings of the disclosure.

In some examples, the one or more cell sites are one or more small cell sites. These can be easier and quicker to deploy than macrocells and in some examples can be deployed indoors. In other examples, the small cells can be deployed outdoors. In some examples, a small cell can be deployed by an end user. In addition, such small cells can be straightforward to temporarily deploy, for example, to help improve MNO characteristics during a music festival. In some examples, the deployment plan specifies locations for the one or more cell sites where the MNO network has one or more poor performance characteristics. Thereby the areas which have poor performance characteristics can be ameliorated. An illustrative example of this is shown in FIGS. 6a, 6B which show the effect of deploying cell sites in areas of poor NMO network coverage. In some examples, the sensor data is collected on a plurality of MNO networks and the spatial map of characteristics is generated for each MNO network, and wherein the deployment plan specifies locations for the one or more cell sites where two or more of the MNO networks have one or more poor performance characteristics. Accordingly, a deployment plan is provided which can collectively ameliorate the poor MNO performance characteristics across a plurality of MNO networks. For example, such a deployment plan can be useful where the small cells use shared spectrum (e.g. open access spectrum) and a single small cell serves each of a plurality of MNO networks.

In some examples, the method then continues to step S420.

As step S420, the method generates a predicted spatial map of characteristics after deployment of the one or more cell sites based on the plurality of sensor data, the spatial map of building locations and a predictive model. Thereby, the specific geographic effect of the deployment can be predicted and in some examples can be explicitly verified after deployment. This can aid in modifying the deployment plan to achieve a specific desired outcome, for example, a minimum standard for an MNO network characteristic after deployment. In some examples, the minimum standard can take into account variations in MNO network characteristics over time or environmental conditions. In some examples, the predictive model is a statically coded model, for example, based on historic measurements of cell characteristics. In other examples, the predictive model is an adaptive machine learning model that uses measurements of one or more prior deployment of the present system as training data.

FIG. 5 schematically illustrates a method 500 for assessing the effect of implementing a deployment plan according to teachings of the disclosure. It will be understood that the method 500 can be performed using the electronic device of the type shown in FIG. 7 and can, in some examples, be performed following step S230 of method 200 or after either of steps S410 or S420 of method 400. The method includes the following steps.

At step S510, the method retrieves a second plurality of sensor data on the MNO network collected from a plurality of mobile network devices after deployment of one or more cell sites into the MNO network where the sensor data comprises a measurement location. The method then continues to step S520.

At step S520, the method processes the second plurality of sensor data and the spatial map of building locations to generate a second spatial map of second performance and/or usage characteristics of the MNO network. Thereby, the state of the MNO network deployment can be accurately determined thereby allowing for the effectiveness of a cell site deployment to be assessed. In some examples, the method then continues to step S530.

At step S530, the method generates a comparative spatial map of differences in characteristics between the spatial map and the second spatial map. Thereby the effect of the deployment plan can be directly highlighted. In some examples the method then continues to step S540.

At step S540, the method generates a predicted spatial map of characteristics after deployment of the one or more cell sites based on the plurality of sensor data, the spatial map of building locations and a predictive model. The method then continues to step S550.

At step S550, the method generates a comparative map of the differences in characteristics between the predicted spatial map and the second spatial map. Thereby, inaccuracies between the prediction and the actual effect of the deployment are directly highlighted. In some examples the method then continues to step S560.

At step S560, the method updates the predictive model using the comparative map of the differences in characteristics between the predicted spatial map and the second spatial map. Thereby the predictive model can be refined allowing for more accurate future predictions.

The present example depicts the steps of method 500 in the order S510, S520, S530, S540, S550 and S560. However, it will be appreciated that where the method omits step S520 the method can jump straight from step S510 to step S530. It will also be appreciated that step S520 (if present) could be performed after either or both of steps S530 (if present) and S540 (if present).

FIG. 6A shows a schematic illustration of an MNO spatial coverage map (e.g. the MNO SINR above a minimum threshold value) before deployment of a number of small cells. The MNO spatial coverage map 600A depicts a plurality of macrocell sites 610 together with coverage boundaries 620 for each macrocell site 620. As can be seen there are two regions towards the centre of the figure where there are gaps in coverage.

FIG. 6B shows a schematic illustration of an MNO spatial coverage map after deployment of a number of small cells. As can be seen, two small cells 630 have been added to which fill in the two gaps in coverage. From one perspective, the locations of two small cells can have been previously determined as part of a deployment plan according to the above-described techniques.

Figure 7:
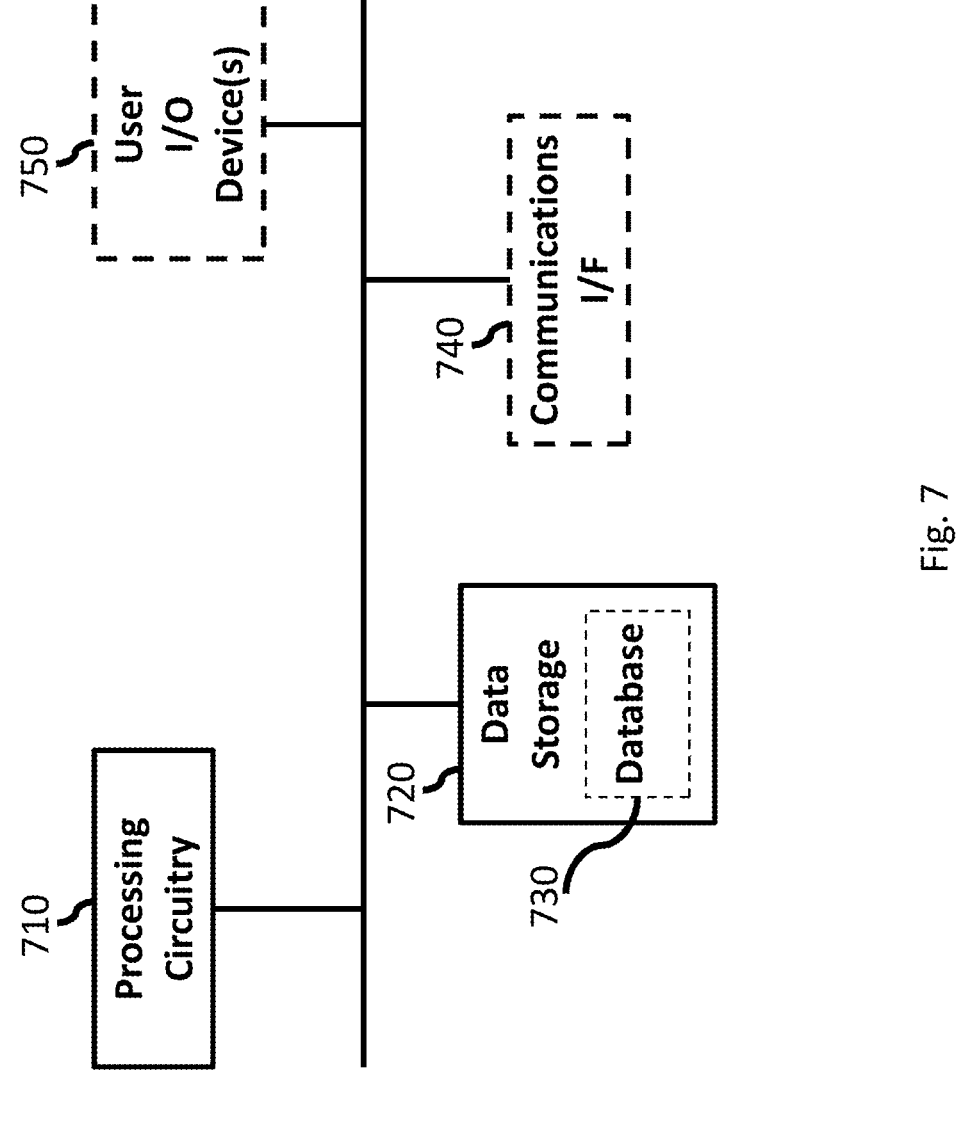
FIG. 7: Schematically illustrates an example of an electronic device which can be used to implement teachings of the disclosure.

FIG. 7 schematically illustrates an example of an electronic device 700 which can be used to implement teachings described above, including method 200, method 400 and method 500.

The electronic device 700 has processing circuitry 710 for performing data processing in response to program instructions and data storage 720 for storing data and instructions to be processed by the processing circuitry 710. In some examples, the processing circuitry 710 includes one or more caches for caching recent data or instructions. The data storage 720 may have a database 730 which can, for example, store sensor data or environmental conditions. It will be appreciated that FIG. 7 is merely an example of possible hardware that may be provided in the device and other components may also be provided. For example, the device may include a communications interface 740 which can be used to retrieve sensor data from a plurality of mobile network devices. The device 700 may additionally or alternatively be provided with one or more user input/output device(s) 750 to receive input from a user (e.g. parameters to determine information for a deployment plan) or to output information (e.g. a spatial map of MNO network characteristics and/or a deployment plan) to a user.

The methods discussed above may be performed under control of a computer program executing on a device. Hence a computer program may comprise instructions for controlling a device to perform any of the methods discussed above. The program can be encoded in a computer-readable medium. A computer-readable medium may include non-transitory type media such as physical storage media including storage discs and solid state devices. A computer-readable medium may also or alternatively include transient media such as carrier signals and transmission media. A computer-readable storage medium is defined herein as a non-transitory memory device. A memory device includes memory space within a single physical storage device or memory space spread across multiple physical storage devices.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative teachings of the disclosure have been described in detail herein with reference to the accompanying drawings, it is to be understood that the invention is not limited to those precise teachings, and that various changes and modifications can be effected therein by one skilled in the art without departing from the scope and spirit of the invention as defined by the appended claims.

Further examples of feature combinations taught by the present disclosure are set out in the following numbered clauses:

1. A computer-implemented method for determining information for the deployment of one or more small cells into an existing MNO network, the method comprising:
    retrieving a spatial map of building locations;
    retrieving a plurality of sensor data on the MNO network collected from a plurality of mobile network devices, wherein the sensor data comprises a measurement location;
    processing the plurality of sensor data and the spatial map of building locations to generate a spatial map of performance and/or usage characteristics of the MNO network.

2. The method of clause 1, wherein retrieving the plurality of sensor data comprises accessing a database storing one or more of the plurality of sensor data.

3. The method of clause 1 or clause 2, wherein retrieving the plurality of sensor data comprises receiving one or more of the plurality of sensor data from one or more of the plurality of mobile network devices.

4. The method of any preceding clause, wherein the sensor data comprises one or more of frequency band, RSRP, SINR, DL bits/s, UL bits/s, DL bits, UL bits and carrier identification.

5. The method of any preceding clause, wherein the plurality of sensor data points comprises more than 1 billion measurement points.

6. The method of any preceding clause, wherein one or more of the plurality of mobile network devices comprise UE and/or small cells.

7. The method of any preceding clause, wherein the processing comprises homogenising the sensor data into a standardised format.

8. The method of any preceding clause, wherein the processing comprises extrapolating from the plurality of sensor data to measurement locations beyond the one or more measurement locations present in the plurality of sensor data.

9. The method of any preceding clause, wherein the processing comprises correlating between two or more types of sensor data to generate a synthetic measurement.

10. The method of any preceding clause, wherein the characteristics comprise coverage, signal quality, percentage dropped traffic, average traffic, peak traffic and/or network usage.

11. The method of any preceding clause, wherein the sensor data comprises a measurement time, and wherein the characteristics are generated as a time-varying spatial map.

12. The method of clause 11, wherein the spatial map is generated by time of day, and/or the spatial map is generated by time and day of the week, and/or the spatial map is generated by time of year.

13. The method of any preceding clause further comprising retrieving a spatial map of weather conditions, wherein the characteristics are generated as a weather-varying spatial map and wherein the generation of the spatial map is generated by processing the spatial map of weather conditions in conjunction with the plurality of sensor data and the spatial map of building locations.

14. The method of any preceding clause, wherein the spatial map of characteristics provides characteristics at a configurable hexbin, per building or finer granularity.

15. The method of any preceding clause, wherein sensor data is collected on a plurality of MNO networks and the spatial map of characteristics is generated for each MNO network.

16. The method of any preceding clause further comprising generating a deployment plan based on the generated spatial map of characteristics which identifies locations for adding one or more cell sites.

17. The method of clause 16, wherein the one or more cell sites are one or more small cell sites.

18. The method of clause 16 or clause 17, wherein the deployment plan specifies locations for the one or more cell sites where the MNO network has one or more poor performance characteristics.

19. The method of clause 18, wherein sensor data is collected on a plurality of MNO networks and the spatial map of characteristics is generated for each MNO network, and wherein the deployment plan specifies locations for the one or more cell sites where two or more of the MNO networks have one or more poor performance characteristics.

20. The method of any of clauses 16 to 19 further comprising generating a predicted spatial map of characteristics after deployment of the one or more cell sites based on the first plurality of sensor data, the spatial map of building locations and a predictive model.

21. The method of any preceding clause further comprising:
    retrieving a second plurality of sensor data on the MNO network collected from a plurality of mobile network devices after deployment of one or more cell sites into the MNO network, wherein the sensor data comprises a measurement location; and processing the second plurality of sensor data and the spatial map of building locations to generate a second spatial map of second performance and/or usage characteristics of the MNO network.

22. The method of clause 21 further comprising generating a comparative spatial map of differences in characteristics between the spatial map and the second spatial map.

23. The method of clause 21 or clause 22 further comprising:

generating a predicted spatial map of characteristics after deployment of the one or more cell sites based on the first plurality of sensor data, the spatial map of building locations and a predictive model; and generating a comparative map of the differences in characteristics between the predicted spatial map and the second spatial map.

24. The method of clause 23 further comprising updating the predictive model using the comparative map of the differences in characteristics between the predicted spatial map and the second spatial map.

25. A computer program to control a device to perform the method of any preceding clause.

26. At least one computer-readable medium comprising the computer program of clause 25.

27. A device comprising a processor and data storage, the device configured to perform the method of any of clauses 1 to 24.

The invention claimed is:

1. A computer-implemented method for determining information for the deployment of one or more small cells into an existing Mobile Network Operator (MNO) network, the method comprising:

retrieving a spatial map of building locations;

retrieving a plurality of sensor data on the MNO network collected from a plurality of mobile network devices, wherein the sensor data comprises a measurement location;

processing the plurality of sensor data and the spatial map of building locations to generate a spatial map of performance and/or usage characteristics of the MNO network;

generating a deployment plan based on the generated spatial map of performance and/or usage characteristics of the MNO network, wherein the deployment plan identifies locations for adding one or more cell sites; and generating a predicted spatial map of characteristics after deployment of the one or more cell sites based on the plurality of sensor data, the spatial map of building locations and a predictive model.

2. The method of claim 1, wherein retrieving the plurality of sensor data comprises accessing a database storing one or more of the plurality of sensor data and/or comprises receiving one or more of the plurality of sensor data from one or more of the plurality of mobile network devices.

3. The method of claim 1, wherein the sensor data comprises one or more of frequency band, Reference Signal Received Power (RSRP), signal-to-interference-plus-noise ratio (SINR), downloaded bits per second, uploaded bits per second, downloaded bits, uploaded bits, and carrier identification.

4. The method of claim 1, wherein the plurality of sensor data comprises more than 1 billion measurement points.

5. The method of claim 1, wherein one or more of the plurality of mobile network devices comprise user equipment and/or small cells.

6. The method of claim 1, wherein the processing comprises homogenising the sensor data into a standardised format.

7. The method of claim 1, wherein the processing comprises extrapolating from the plurality of sensor data to measurement locations beyond the measurement location present in the plurality of sensor data.

8. The method of claim 1, wherein the processing comprises correlating between two or more types of sensor data to generate a synthetic measurement.

9. The method of claim 1, wherein the characteristics comprise coverage, signal quality, percentage dropped traffic, average traffic, peak traffic and/or network usage.

10. The method of claim 1, wherein the sensor data comprises a measurement time, and wherein the characteristics are generated as a time-varying spatial map, and optionally wherein the spatial map is generated by time of day, and/or the spatial map is generated by time and day of the week, and/or the spatial map is generated by time of year.

11. The method of claim 1, further comprising retrieving a spatial map of weather conditions, wherein the characteristics are generated as a weather-varying spatial map and wherein the generation of the spatial map is generated by processing the spatial map of weather conditions in conjunction with the plurality of sensor data and the spatial map of building locations.

12. The method of claim 1, wherein the spatial map of performance and/or usage characteristics of the MNO network provides characteristics at a configurable hexbin, per building or finer granularity.

13. The method of claim 1, wherein sensor data is collected on a plurality of MNO networks and the spatial map of performance and/or usage characteristics of the MNO network is generated for each MNO network.

14. The method of claim 1, wherein the one or more cell sites are one or more small cell sites.

15. The method of claim 1, wherein the deployment plan specifies locations for the one or more cell sites where the MNO network has one or more poor performance characteristics, and optionally wherein sensor data is collected on a plurality of MNO networks and the spatial map of characteristics is generated for each MNO network, and wherein the deployment plan specifies locations for the one or more cell sites where two or more of the MNO networks have one or more poor performance characteristics.

16. The method of claim 1, further comprising:

retrieving a second plurality of sensor data on the MNO network collected from a plurality of mobile network devices after deployment of one or more cell sites into the MNO network, wherein the sensor data comprises a measurement location;

processing the second plurality of sensor data and the spatial map of building locations to generate a second spatial map of second performance and/or usage characteristics of the MNO network; and optionally further comprising generating a comparative spatial map of differences in characteristics between the spatial map and the second spatial map.

17. The method of claim 16, further comprising:

generating a comparative map of the differences in characteristics between the predicted spatial map and the second spatial map; and optionally further comprising updating the predictive model using the comparative map of the differences in characteristics between the predicted spatial map and the second spatial map.

18. A non-transitory, computer-readable storage medium comprising instructions for controlling an electronic device to:

retrieve a spatial map of building locations;

retrieve a plurality of sensor data on a Mobile Network Operator (MNO) network collected from a plurality of mobile network devices, wherein the sensor data comprises a measurement location;

process the plurality of sensor data and the spatial map of building locations to generate a spatial map of performance and/or usage characteristics of the MNO network;

generate a deployment plan based on the generated spatial map of performance and/or usage characteristics of the MNO network, wherein the deployment plan identifies locations for adding one or more cell sites; and generate a predicted spatial map of characteristics after deployment of the one or more cell sites based on the plurality of sensor data, the spatial map of building locations and a predictive model.

19. An electronic device comprising:

processing circuitry to perform data processing; and data storage storing at least one computer program for controlling the processing circuitry to:

retrieve a spatial map of building locations;

retrieve a plurality of sensor data on a Mobile Network Operator (MNO) network collected from a plurality of mobile network devices, wherein the sensor data comprises a measurement location;

process the plurality of sensor data and the spatial map of building locations to generate a spatial map of performance and/or usage characteristics of the MNO network;

generate a deployment plan based on the generated spatial map of performance and/or usage characteristics of the MNO network, wherein the deployment plan identifies locations for adding one or more cell sites; and generate a predicted spatial map of characteristics after deployment of the one or more cell sites based on the plurality of sensor data, the spatial map of building locations and a predictive model.

\* \* \* \* \*